May 17, 1932.  H. WEIDA  1,858,650
STEERING WHEEL
Filed May 13, 1929  2 Sheets-Sheet 1

INVENTOR
HARRY WEIDA
BY
Evans & McCoy
ATTORNEYS

May 17, 1932.     H. WEIDA     1,858,650
STEERING WHEEL
Filed May 13, 1929     2 Sheets-Sheet 2
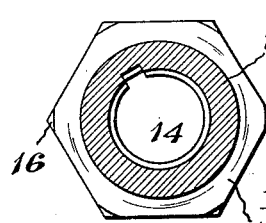
Fig. 4.
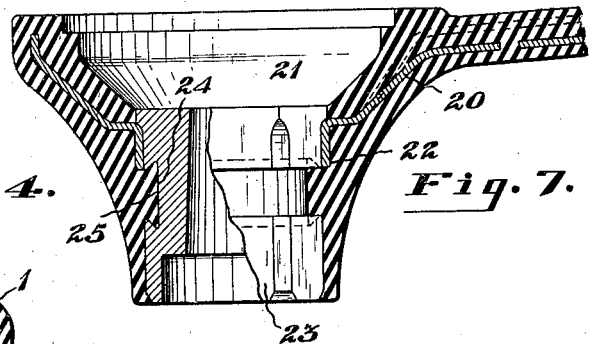
Fig. 7.
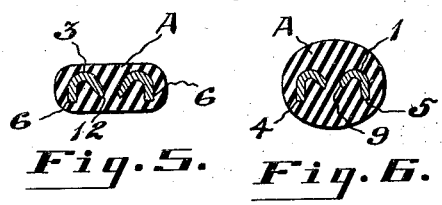
Fig. 5.     Fig. 6.
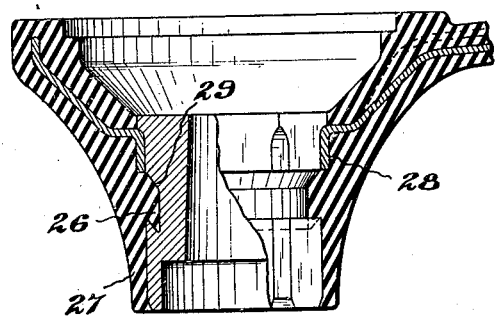
Fig. 8.
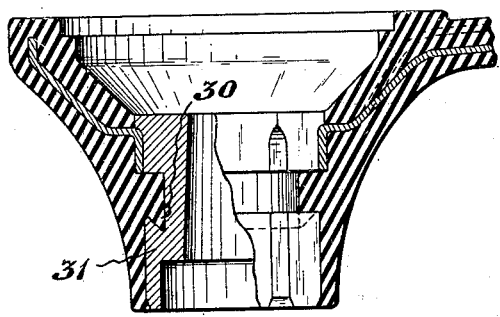
Fig. 9.
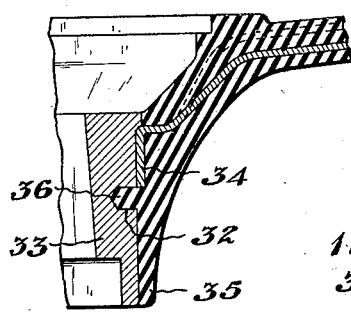
Fig. 10.
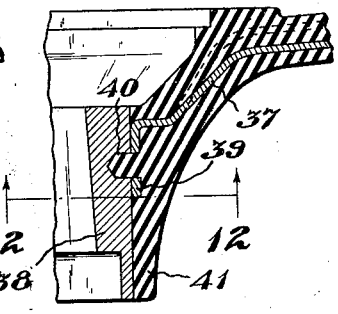
Fig. 11.
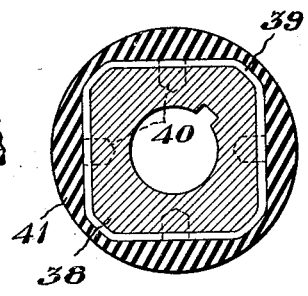
Fig. 12.
INVENTOR
HARRY WEIDA
BY
Evans + McCoy
ATTORNEYS Patented May 17, 1932

1,858,650

UNITED STATES PATENT OFFICE

HARRY WEIDA, OF PLAINFIELD, NEW JERSEY, ASSIGNOR TO AMERICAN HARD RUBBER COMPANY, OF NEW YORK, N. Y., A CORPORATION OF NEW YORK

STEERING WHEEL

Application filed May 13, 1929. Serial No. 362,705.

This invention relates to steering wheels of the reinforced composition type and more particularly to the hub constructions thereof.

One of the objects of the present invention is to provide a new and novel means for securely holding a separately formed hub in place in a composition steering wheel.

Another object is to provide a reinforced composition steering wheel with a hub pressed into a reinforcing spider which is securely held in position by the composition material surrounding the same.

A further object is to provide a reinforced composition steering wheel with a hub pressed into a reinforcing spider, the hub being held in position in the spider by the composition material surrounding the same which is in engagement with recesses or depressions formed in the hub.

With the above and other objects in view, the present invention may be said to comprise the steering wheel as illustrated in the accompanying drawings to be hereinafter described and particularly set forth in the appended claims, together with such variations and modifications thereof as will be apparent to one skilled in the art to which the invention appertains.

In the accompanying drawings which illustrate suitable embodiments of the present invention, Figure 1 is a plan view of a reinforced composition steering wheel, a portion of the composition material being broken away to show the reinforcing spider thereof.

Fig. 4 is a section of the hub member taken on the line 4—4 of Fig. 3.

Fig. 5 is a transverse section of one of the spokes of the wheel taken on the line 5—5 of Fig. 1.

Fig. 6 is a transverse section of the rim of the wheel taken on the line 6—6 of Fig. 1.

Fig. 7 is a transverse section of the hub portion of a modified type of steering wheel showing a modified interlocking means therefor.

Figs. 8, 9 and 10 are sections similar to Fig. 7 showing further modifications of the hub interlocking means.

Fig. 11 is a section of the hub portion of a wheel having a square hub member, and showing a further modification of interlocking means for holding the hub in position in the spider.

Fig. 12 is a transverse section taken on the line 12—12 of Fig. 11.

Figure 1:
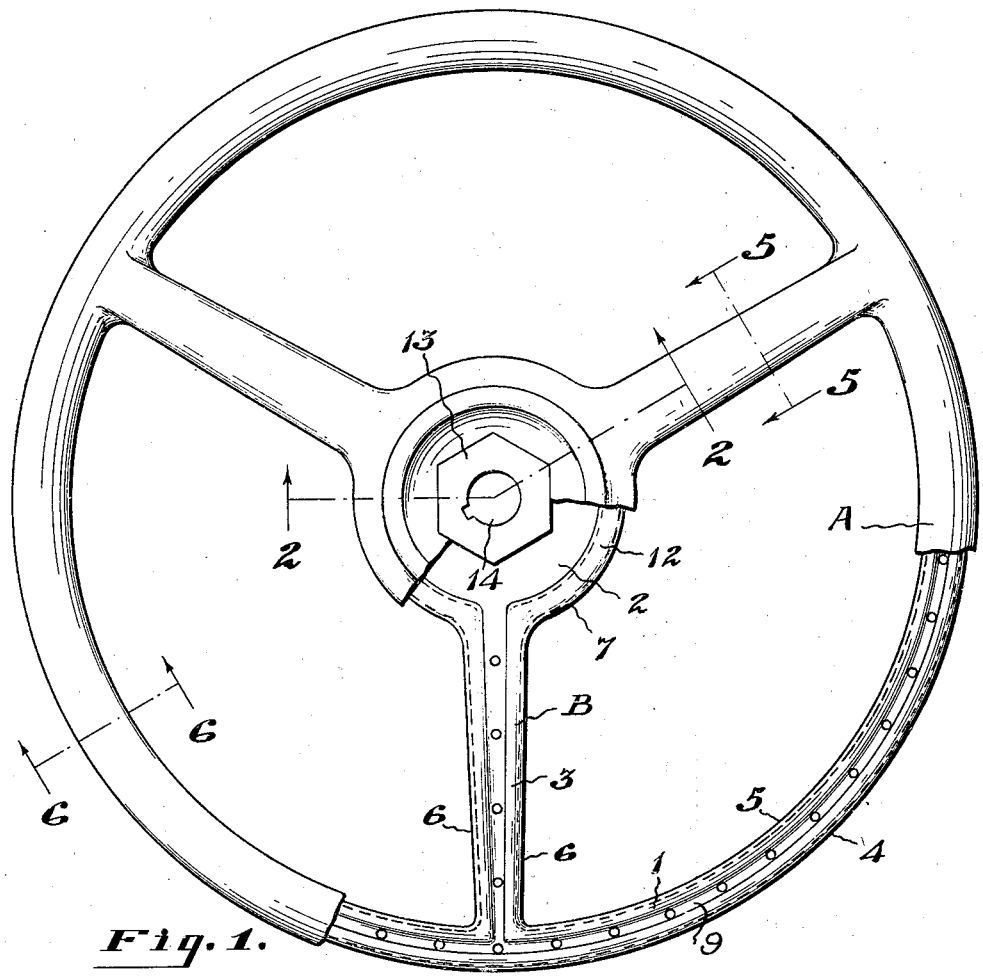

The present invention proposes a novel and improved hub construction for composition steering wheels embodying a separately formed hub member which is pressed into the hub portion of a reinforcing spider and embedded in a body of composition material. In the hub construction of the present invention, bolts or screws and other means of securing the hub to the spider hub portion are eliminated, the hub being held in position by a composition interlock formed by filling in a recess in the hub adjacent the edge of the spider hub with the composition in which the spider and hub are embedded.

Referring to the accompanying drawings in which like numerals refer to like parts throughout the several views, the steering wheel embodying the present invention has a body "A" composed of a suitable composition material, such as hard rubber or other initially plastic moldable composition, the composition material being molded around a pressed metal reinforcing spider "B". The spider B is preferably formed from a single piece of sheet metal having a continuous rim 1, a continuous hub annulus 2, and radial spokes 3 joining the rim and hub annulus 2, and integrally connected with both.

The rim 1 is provided with an outer continuous flange 4 along the outer edge thereof, and with flanges 5 along the inner edge thereof between the spokes 3. The spokes 3 are also provided with side flanges 6 which are continuous with the inner flanges 5 of the rim 1 and are continuous with flanges 7 along the outer edge of the hub annulus 2 between the spokes 3, the flanges 5, 6, and 7 thus forming a continuous flange around each opening between the spokes 3 of the reinforcing spider B. The hub annulus 2 is formed with a central opening 10 and with a continuous downwardly extending flange 8 at its inner edge which defines the central opening 10. The flange 8 is of polygonal shape for receiving a polygonal shaped hub that will be later described. The side flanges of the rim, spokes and hub annulus reinforce the spider A throughout, but in order to obtain greater strength and rigidity, the rim 1 is formed with a continuous reinforcing rib 9 in the form of a corrugation pressed in the web of the channel between the flanges 4 and 5, the hub annulus 2 being provided with a circumferential reinforcing rib 11 in the form of a corrugation in the web of the same adjacent to the edge of the flange 7. The spokes 3 are each provided with a longitudinal rib 12 in the form of a corrugation in the web thereof between the side flanges 6 and projecting in the same direction as the flanges 6, the ribs 12 of the spokes 3 being continuous with the rib 11 of the hub annulus and with the rib 9 of the rim 1.

The important feature of the present invention is the provision of an improved hub construction for the reinforcing spider B. A steering wheel embodying the hub construction of the present invention, is considerably strengthened and because of the simplicity of construction, ease of assembly of the hub to the spider, and the ultimate elimination of hub securing bolts, rivets, screws, and other securing means, such as welding.

Figure 2:
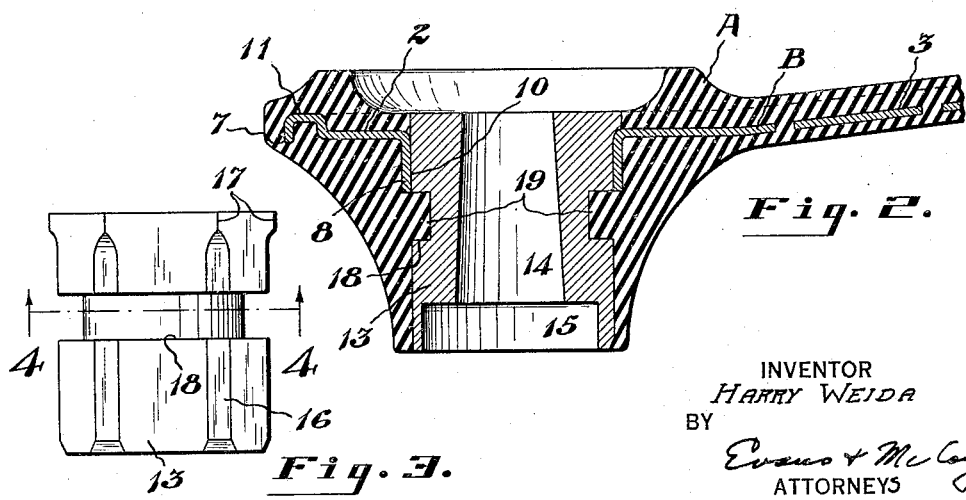
Fig. 2 is an enlarged section of the hub portion of the wheel taken on the line 2—2 of Fig. 1.
Figure 3:
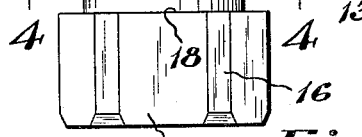
Fig. 3 is a side elevation of the separately formed hub member.

The hub member 13 illustrated in Figs. 2, 3 and 4, is preferably formed of polygonal shaped or other non-circular stock. The hub 13 because of its simplicity is particularly adapted to be formed in an automatic screw machine which simultaneously performs all the machining operations. This hub member, however, may be otherwise formed, if desired, such as by casting the same to a polygonal shape. It is to be understood that the hub is not limited to the hexagonal shape shown, as it may be triangular, square, hexagonal or octagonal in cross section, or any other shape as long as it is provided with one or more surfaces which will prevent relative rotational movement between the spider and hub, when the hub is pressed into the spider. The hub 13 is formed with a tapered central opening 14 which is counterbored at 15 at its lower end, if desired, the central opening 14 providing means for attachment to a steering post (not shown). The intersecting side faces of the hub 13 are rounded off as shown in Figs. 2 and 3 to provide rounded surfaces 16. The rounded surfaces 16, however, do not extend the entire length of the hub 13 but terminate just below the end opposite the counterbore 15 so that the hub is provided with projections 17 which overlie the rounded surfaces 16.

The hub 13 is driven into the central opening 10 of the spider hub annulus 2 with a press fit, so that the sides of the polygonal flange 8 rigidly and securely engage the corresponding sides of the hub 13. The overlying projections 17 engage the web of the hub annulus and insure axial alignment of the hub 13 with the spider B.

The hub 13 as shown in Figs. 2, 3 and 4 is formed with a relatively deep recess 18 extending around the perimeter thereof adjacent the edge of the flange 8. The composition body A, when it is molded around the spider B and hub 13 to embed the same, is forced to completely fill the groove or recess 18 as shown in Fig. 2 and thereby provide an interlock 19 of composition material. This interlock 19 securely holds the hub 13 in position in the spider B. It is evident to those skilled in the art that the hub 13 could not be inadvertently disassembled from the spider while the wheel is assembled to a vehicle because of the interlock 19. The flange 8, should the hub 13 become loosened therein, would, of necessity, have to shear the entire depth of the interlock 19 of composition, before the hub 13 and spider could be separated, and it is apparent that a preponderance of pressure would have to be exerted in order to shear the interlock 19. The interlock 19 provides a very economical and efficient means for securing the hub 13 to the spider B because bolts, screws and other securing means such as welding, as well as assembly operations, are eliminated.

Fig. 7 illustrates a modified type of interlock as well as a modified type of spider hub annulus. In this modification, the hub portion 20 of the spider is cupped so as to form a central recess 21 adapted to receive control mechanism such as, horn buttons, gas, spark and light controls, locks, or the like. The spider hub 20 is provided with a polygonal flange 22 defining the central opening thereof as previously described, which receives a polygonal hub 23 with a press fit. The hub 23 is similar to the hub 13 described in connection with Figs. 1 to 6 inclusive, with the exception that the interlocking groove or recess 24 which is provided in the perimeter thereof adjacent the edge of the flange 22, is formed to a dove-tailed shape instead of with parallel side walls. The composition interlock 25 which fills the recess 24 is positively held against any radial movement so that it cannot be easily and inadvertently withdrawn therefrom to allow the hub 23 to work loose from the spider flange 22.

The interlock 26 shown in Fig. 8 for holding the hub 27 in position in the spider flange 28, is similar to that shown in Fig. 7 with the exception that the walls of the interlocking recess 29 are both inclined in the same general direction.

The interlocking recess 30 shown in Fig.

9 is further modified in that the lower wall thereof is inclined as in Fig. 7 and the upper wall thereof is disposed perpendicular to the axis of the hub 31.

The modification of the hub construction shown in Fig. 10 differs from the previously described interlocks, in that the recess is replaced by a series of openings 32 drilled at spaced intervals in the hub 33 adjacent the edge of the spider flange 34. The composition 35 as it is molded around the spider and hub 33 is forced into the drilled openings 32 and provides a plurality of satisfactory interlocks 36.

The construction illustrated in Figs. 11 and 12 embodies a flanged spider 37 similar to that previously described and a four-sided hub 38 which is forced into the central opening of the spider with a press fit and which very intimately engages the side walls of spider flange 39. In this construction, a plurality of openings 40 are drilled through the walls of the flange 39 and into the hub 38 substantially as shown. The composition body 41 is molded around the spider 37 and hub 38 and extends into the openings 40 to provide the interlocks which satisfactorily prevent inadvertent withdrawal of the hub 38 from the spider 37.

In the hub constructions shown in the several modifications, it is to be noted that the composition body which is molded around and embeds the reinforcing spider and hub, forms an interlocking means with the hub which prevents withdrawal of the hub from the spider. It is also apparent that in all cases the interlocks are of sufficient depth to prevent shearing of the same by the edge of the hub flange in the event that the wheel is subjected to a sudden downward pressure as is occasioned in an accident.

Furthermore, it can be seen that the cost of producing steering wheels can be materially lessened by employing the interlocking means of the present invention because of the elimination of the material costs of bolts, screws, and the like and the elimination of assembly costs incident thereto.

Although the spider described is the preferable construction because of its strength and rigidity, it is to be understood that the present invention is adaptable to any steering wheel having a hub pressed into the hub portion of the spider around which composition material is molded, regardless of whether or not the spider is constructed of a plurality of pieces or of a single piece as described.

Furthermore, it is to be understood that formal changes may be made in the specific embodiment of the invention described without departing from the spirit and substance of the broad invention, the scope of which is commensurate with the appended claims.

What I claim is:

1. In a composition steering wheel, a reinforcing spider including a hub annulus having a depending inner flange, a separately formed hub member in intimate telescoping engagement with said flange and having radially extending portions engaging one side of said annulus to hold said hub against axial movement in one direction relative to said flange, said hub member having a recess formed therein adjacent the edge of said flange, and a body of composition material surrounding said spider and hub member and extending into intimate contact with the walls of said recess to lock said hub against axial movement in the other direction relative to said flange.

2. In a composition steering wheel, a reinforcing spider including a hub annulus having a depending inner flange, a separately formed hub member telescoped in intimate engagement with said flange and having overlying portions thereon engaging one side of said hub annulus for holding said hub member against axial movement in one direction relative to said flange, said hub member having a continuous recess formed around the periphery thereof adjacent the edge of said flange, and a body of composition material surrounding said hub annulus and hub member and extending into intimate contact with the walls of said recess to lock said hub against axial movement in the other direction relative to said flange.

In testimony whereof I affix my signature.

HARRY WEIDA.